US012578941B2

(12) United States Patent
Kong et al.

(10) Patent No.: US 12,578,941 B2
(45) Date of Patent: Mar. 17, 2026

(54) TECHNIQUE FOR INTER-PROCEDURAL MEMORY ADDRESS SPACE OPTIMIZATION IN GPU COMPUTING COMPILER

(71) Applicant: NVIDIA CORPORATION, Santa Clara, CA (US)

(72) Inventors: Xiangyun Kong, Union City, CA (US); Jian-Zhong Wang, Fremont, CA (US); Yuan Lin, Cupertino, CA (US); Vinod Grover, Mercer Island, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/195,776

(22) Filed: Nov. 19, 2018

(65) Prior Publication Data

US 2019/0087164 A1 Mar. 21, 2019

Related U.S. Application Data

(63) Continuation of application No. 13/659,802, filed on Oct. 24, 2012, now abandoned.

(Continued)

(51) Int. Cl.
*G06F 8/41* (2018.01)
*G06F 9/50* (2006.01)

(52) U.S. Cl.
CPC ................ *G06F 8/443* (2013.01); *G06F 8/41* (2013.01); *G06F 8/433* (2013.01); *G06F 8/45* (2013.01);

(Continued)

(58) Field of Classification Search
CPC . G06F 8/443; G06F 8/456; G06F 8/41; G06F 9/5066; G06F 8/45; G06F 8/433; G06F 8/445; G06F 8/4442
See application file for complete search history.

(56) References Cited

U.S. PATENT DOCUMENTS

| | | | |
|---|---|---|---|
| 4,449,196 A | 5/1984 | Pritchard | |
| 6,286,135 B1 | 9/2001 | Santhanam | |

(Continued)

FOREIGN PATENT DOCUMENTS

| | | |
|---|---|---|
| CN | 102014048 A | 4/2011 |
| TW | 548587 B | 8/2003 |

(Continued)

OTHER PUBLICATIONS

"NVIDIA CUDA Programming Guide"—NVIDIA, Feb. 20, 2010—http://developer.download.nvidia.com/compute/cuda/3_0/toolkit/docs/NVIDIA_CUDA_ProgrammingGuide.pdf (Year: 2010).*

(Continued)

*Primary Examiner* — Kee M Tung
*Assistant Examiner* — Khoa Vu
(74) *Attorney, Agent, or Firm* — Davis Wright Tremaine LLP

(57) ABSTRACT

A device compiler and linker is configured to optimize program code of a co-processor enabled application by resolving generic memory access operations within that program code to target specific memory spaces. In situations where a generic memory access operation cannot be resolved and may target constant memory, constant variables associated with those generic memory access operations are transferred to reside in global memory.

24 Claims, 6 Drawing Sheets

Related U.S. Application Data

(60) Provisional application No. 61/556,782, filed on Nov. 7, 2011.

(52) U.S. Cl.
CPC ............ *G06F 8/456* (2013.01); *G06F 9/5066* (2013.01); *G06F 8/4442* (2013.01); *G06F 8/445* (2013.01)

(56) References Cited

U.S. PATENT DOCUMENTS

| | | | |
|---|---|---|---|
| 6,415,311 | B1 | 7/2002 | Purcell et al. |
| 6,438,747 | B1 * | 8/2002 | Schreiber ................ G06F 8/452 |
| | | | 717/160 |
| 6,523,173 | B1 | 2/2003 | Bergner et al. |
| 2002/0144097 | A1 | 10/2002 | Kawahito et al. |
| 2003/0014550 | A1 | 1/2003 | Fischer et al. |
| 2004/0006681 | A1 | 1/2004 | Moreno et al. |
| 2004/0078789 | A1 | 4/2004 | Ghiya et al. |
| 2004/0162952 | A1 | 8/2004 | Feind et al. |
| 2004/0205304 | A1 | 10/2004 | McKenney et al. |
| 2004/0221283 | A1 | 11/2004 | Worley |
| 2005/0108499 | A1 | 5/2005 | Huang et al. |
| 2005/0203928 | A1 | 9/2005 | Sankaran |
| 2007/0076010 | A1 | 4/2007 | Swamy et al. |
| 2007/0079298 | A1 | 4/2007 | Tian et al. |
| 2007/0124631 | A1 | 5/2007 | Boggs et al. |
| 2008/0184211 | A1 * | 7/2008 | Nickolls ................ G06F 8/456 |
| | | | 717/140 |
| 2008/0235674 | A1 | 9/2008 | Gao et al. |
| 2009/0070753 | A1 | 3/2009 | Chen et al. |
| 2009/0125893 | A1 | 5/2009 | Copeland et al. |
| 2010/0153654 | A1 | 6/2010 | Vorbach et al. |
| 2010/0199270 | A1 | 8/2010 | Baev |
| 2011/0161977 | A1 | 6/2011 | Vorbach |
| 2011/0225573 | A1 | 9/2011 | Zaafrani |
| 2012/0042306 | A1 * | 2/2012 | Kawahito ............... G06F 8/443 |
| | | | 717/151 |
| 2012/0113128 | A1 | 5/2012 | Ryu et al. |
| 2012/0167062 | A1 * | 6/2012 | Levanoni ................ G06F 8/434 |
| | | | 717/138 |
| 2012/0254497 | A1 | 10/2012 | Ni et al. |

FOREIGN PATENT DOCUMENTS

| | | |
|---|---|---|
| TW | 201029401 A | 8/2010 |
| TW | 201106148 A1 | 2/2011 |
| WO | 2011053303 A1 | 5/2011 |

OTHER PUBLICATIONS

Norris, et al., "An experimental study of several cooperative register allocation and instruction scheduling strategies", Proceedings of the 28th Annual International Symposium on Microarchitecture, Nov. 29-Dec. 10, 1995.

Aho et al., "Compilerbau Teil 1," International Computer Library, 1986, 7 pages.

Aho et al., "Compilerbau Teil 2," International Computer Library, 1986, 16 pages.

Larsen et al., "Exploiting Superword Level Parallelism with Multimedia Instruction Sets," in Proceedings of the SIGPLAN '00, May 1, 2000, 12 Pages.

* cited by examiner

COMPUTER SYSTEM 100

400

START

COLLECT MEMORY ACCESSES TO
GENERIC MEMORY SPACE    402

FOR EACH COLLECTED MEMORY ACCESS,
ASCEND USE-DEFINITION CHAIN OF
POINTER ASSOCIATED WITH MEMORY
ACCESS    404

ADD EACH POINTER DERIVED FROM A
SPECIFIC MEMORY SPACE TO
A VECTOR    406

FOR EACH POINTER IN THE VECTOR,
MODIFY ASSOCIATED MEMORY ACCESS
TO TARGET SPECIFIC MEMORY SPACE
FROM WHICH POINTER WAS DERIVED    408

END

600

TECHNIQUE FOR INTER-PROCEDURAL MEMORY ADDRESS SPACE OPTIMIZATION IN GPU COMPUTING COMPILER

CROSS-REFERENCE TO RELATED APPLICATIONS

This application is a continuation of U.S. patent application titled, "TECHNIQUE FOR INTER-PROCEDURAL MEMORY ADDRESS SPACE OPTIMIZATION IN GPU COMPUTING COMPILER," filed on Oct. 24, 2012 and having Ser. No. 13/659,802, which claims the benefit of United States provisional patent application titled, "Method for Inter-Procedural Memory Space Optimization in GPU Computing Compiler," filed on Nov. 7, 2011 and having Ser. No. 61/556,782. The subject matter of these related applications is hereby incorporated herein by reference.

BACKGROUND OF THE INVENTION

Field of the Invention

The present invention generally relates to graphics processing unit (GPU) computing compilers, and, more specifically, to a technique for inter-procedural memory address space optimization in a GPU computing compiler.

Description of the Related Art

Graphics processing units (GPUs) have evolved over time to support a wide range of operations beyond graphics-oriented operations. In fact, a modern GPU may be capable of executing arbitrary program instructions. Such a GPU typically includes a compiler that compiles program instructions for execution on one or more processing cores included within the GPU. Each such core may execute a particular execution thread in parallel with other processing cores executing execution threads.

A given core within a GPU may be coupled to a local memory space that is available to the GPU for memory access operations when executing a thread. Each core may also be coupled to a shared memory space to which one or more other cores may also be coupled. With this configuration, multiple cores may share data via the shared memory space. The cores within the GPU may also be coupled to a global memory space that is accessible to all processing cores and possibly to other processing units aside from the GPU itself.

The configuration of multiple different memory spaces described above is referred to in the art as a "non-uniform memory architecture." In general, a non-uniform memory architecture includes multiple different memory spaces where data may reside. A program designed to execute on a GPU may access data that resides in any or all of the different memory spaces in the non-uniform memory architecture.

Within such a program, different memory access operations may be specified, such as load/store operations or atomic operations, each of which target a different address. However, a given memory access operation targeting a given memory address may not specify any particular memory space. In conventional approaches, at run time, the GPU executing the program typically reads a tag associated with the address that indicates the specific memory space in which to perform the memory access operation. A tag is required for each address because, for example, two different variables may both reside at the same address within different memory spaces. Without such a tag, the two variables would be indistinguishable based on the addresses alone.

Relying on the tagging approach described above is problematic for two reasons. First, reading a tag for each memory access operation is a costly operation and wastes GPU resources. Second, since variables having the same address are indistinguishable until run-time, the GPU compiler is prevented from performing program code optimizations prior to run time, including memory access re-ordering or alias analysis.

Accordingly, what is needed in the art is a more effective technique for compiling GPU program instructions.

SUMMARY OF THE INVENTION

One embodiment of the present inventions sets forth a computer-implemented method for optimizing program code capable of being compiled for execution on a parallel processing unit (PPU) having a non-uniform memory architecture, including identifying a first memory access operation that is associated with a first pointer, where the first memory access operation targets a generic memory space, ascending a use-definition chain related to the first pointer, adding the first pointer to a vector upon determining that the first pointer is derived from a specific memory space in the non-uniform memory architecture, and causing the first memory access operation to target the specific memory space by modifying at least a portion of the program code.

One advantage of the disclosed technique is that a graphics processing unit is not required to resolve all generic memory access operations at run time, thereby conserving resources and accelerating the execution of the application. Further, the graphics processing unit is enabled to perform additional program code optimizations with the application program code, including memory access re-ordering and alias analysis, further accelerating program code execution.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
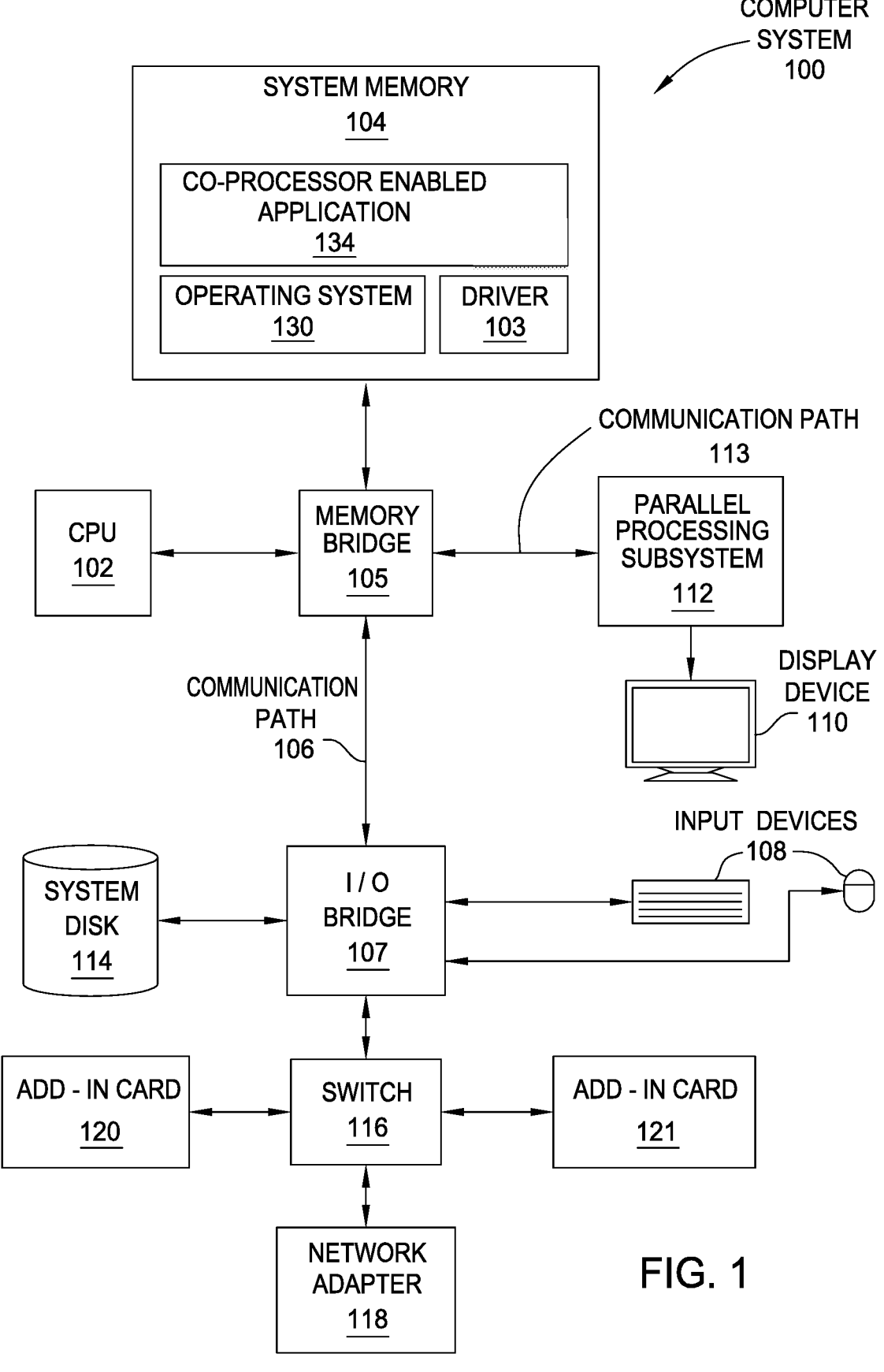
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. System memory 104 includes an image of an operating system 130, a driver 103, and a co-processor enabled application 134. Operating system 130 provides detailed instructions for managing and coordinating the operation of computer system 100. Driver 103 provides detailed instructions for managing and coordinating operation of parallel processing subsystem 112 and one or more parallel processing units (PPUs) residing therein, as described in greater detail below in conjunction with FIG. 2. Driver 103 also provides compilation facilities for generating machine code specifically optimized for such PPUs, as described in greater detail below in conjunction with FIGS. 3-6. Co-processor enabled application 134 incorporates instructions capable of being executed on the CPU 102 and PPUs, those instructions being implemented in an abstract format, such as virtual assembly, and mapping to machine code for the PPUs within parallel processing subsystem 112. The machine code for those PPUs may be stored in system memory 104 or in memory coupled to the PPUs.

In one embodiment, co-processor enabled application 134 represents CUDA™ code that incorporates programming instructions intended to execute on parallel processing subsystem 112. In the context of the present description, the term "application" or "program" refers to any computer code, instructions, and/or functions that may be executed using a processor. For example, in various embodiments, co-processor enabled application 134 may include C code, C++ code, etc. In one embodiment, co-processor enabled application 134 may include a language extension of a computer language (e.g., C, C++, etc.).

Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. Parallel processing subsystem 112 is coupled to memory bridge 105 via a bus or second communication path 113 (e.g., a Peripheral Component Interconnect Express (PCIe), Accelerated Graphics Port (AGP), or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and compact disc (CD) read-only memory (ROM), digital video disc (DVD) ROM, Blu-ray, high-definition (HD) DVD, or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, CD drives, DVD drives, film recording devices, and the like, may also be connected to I/O bridge 107. The various communication paths shown in FIG. 1, including the specifically named communication paths 106 and 113 may be implemented using any suitable protocols, such as PCIe, AGP, HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
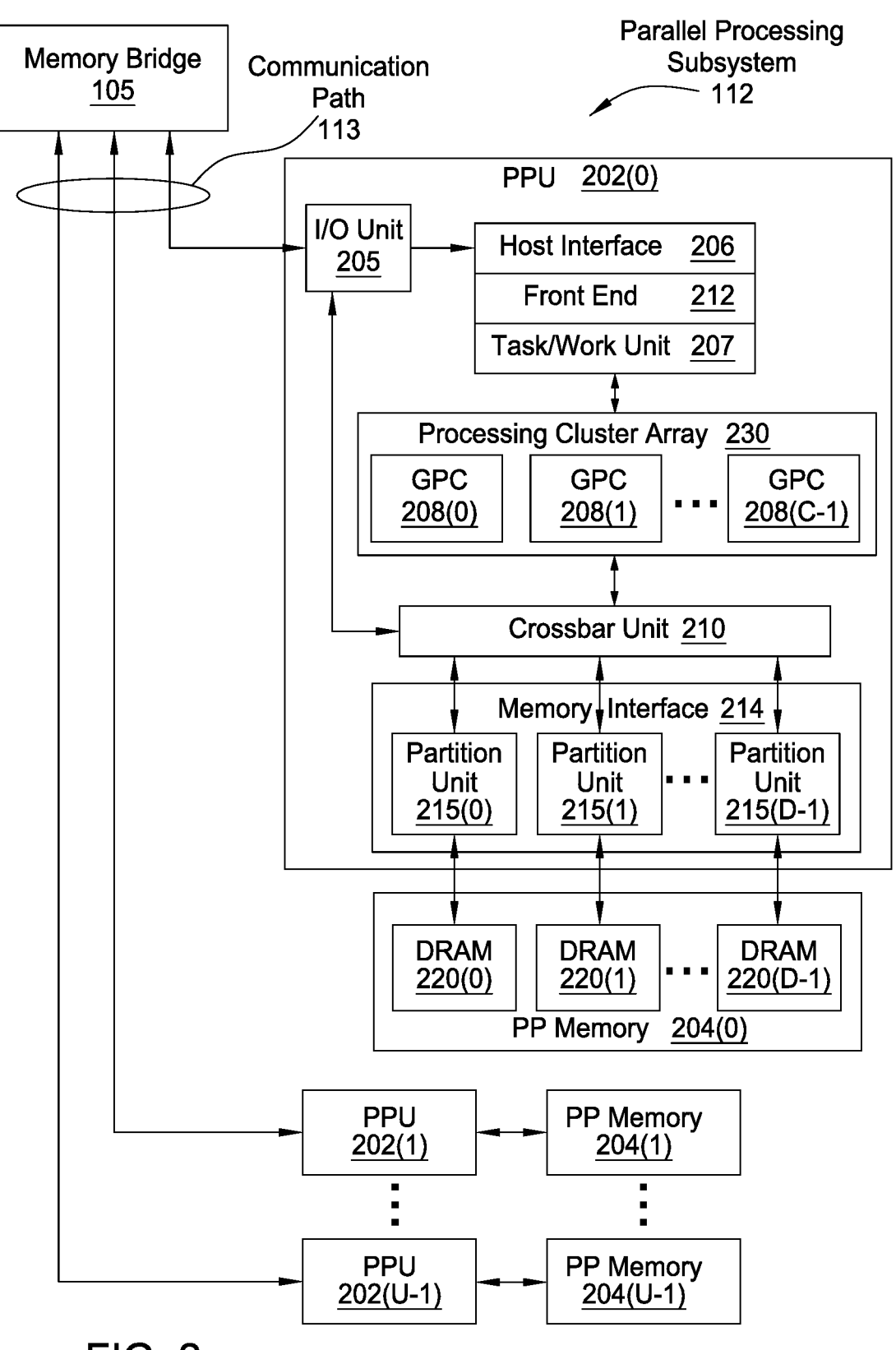
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U is greater than or equal to 1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. PPU 202 reads command streams from one or more pushbuffers and then executes commands asynchronously relative to the operation of CPU 102. Execution priorities may be specified for each pushbuffer by an application program via device driver 103 to control scheduling of the different pushbuffers.

Each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCIe link, as mentioned above, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D 1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means. In the embodiment of the invention described in conjunction with FIGS. 3-6, each PPU 202 is implemented with a non-uniform memory architecture, and, accordingly, each such PPU 202 may have access to multiple different memory spaces as directed by co-processor enabled application 134.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

As mentioned, in the embodiment of the invention described in conjunction with FIGS. 3-6, each PPU 202 is implemented with a non-uniform memory architecture. Accordingly, each such PPU 202 may have access to multiple different memory spaces, such as, e.g., system memory 104 or PP memory 204, among others, as directed by co-processor enabled application 134. A compiler and linker application derived from device driver 103 is configured to optimize and compile program code in order to generate co-processor enabled application 134. That program code may initially include different memory access operations, such as load/store operations or atomic operations, that may not specify a particular memory space with which to perform the memory access operations. Such memory access operations are referred to herein as "generic memory access operations." In order to optimize the program code, the compiler and linker application is configured to modify that program code, as needed, to resolve generic memory access operations into specific memory access operations that target a particular memory space, as described in greater detail below in conjunction with FIGS. 3-6.

Figure 3:
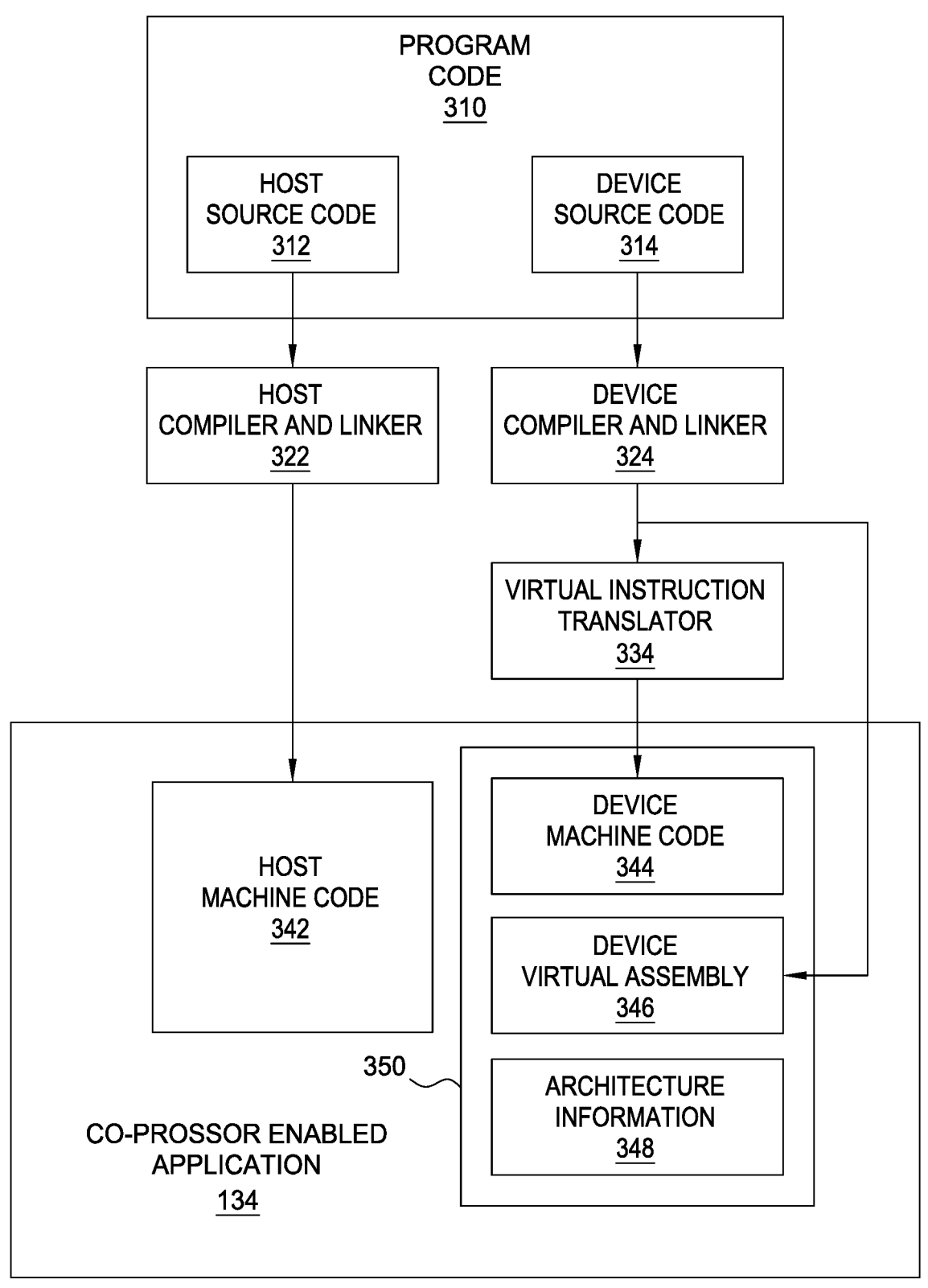
FIG. 3 illustrates a build process used to compile a co-processor enabled application, according to one embodiment of the present invention.

FIG. 3 illustrates the build process used to compile the co-processor enabled application 134 of FIG. 1, according to one embodiment of the present invention. Program code 310 includes host source code 312 and device source code 314. Host source code 312 incorporates programming instructions intended to execute on a host, such as an x86-based personal computer (PC) or server. The programming instructions in source code 312 may include calls to functions defined in device source code 314. Any technically feasible mechanism may be used to specify which functions are designated as device source code 314.

Host source code 312 is pre-processed, compiled, and linked by a host compiler and linker 322. The host compiler and linker 322 generates host machine code 342, which is stored within co-processor enabled application 134.

Device source code 314 is pre-processed, compiled and linked by a device compiler and linker 324. This compile operation constitutes a first stage compile of device source code 314. Device compiler and linker 324 generates device virtual assembly 346, which is stored within a device code repository 350, residing with or within co-processor enabled application 134. A virtual instruction translator 334 may generate device machine code 324 from device virtual assembly 346. This compile operation constitutes a second stage compile of device source code 314. Virtual instruction translator 334 may generate more than one version of device machine code 344, based on the availability of known architecture definitions. For example, virtual instruction translator 334 may generate a first version of device machine code 344, which invokes native 64-bit arithmetic instructions (available in the first target architecture) and a second version of device machine code 344, which emulates 64-bit arithmetic functions on targets that do not include native 64-bit arithmetic instructions.

Architectural information 348 indicates the real architecture version used to generate device machine code 344. The real architecture version defines the features that are implemented in native instructions within a real execution target, such as the PPU 202. Architectural information 348 also indicates the virtual architecture version used to generate device virtual assembly 346. The virtual architecture version defines the features that are assumed to be either native or easily emulated and the features that are not practical to emulate. For example, atomic addition operations are not practical to emulate at the instruction level, although they may be avoided altogether at the algorithmic level in certain cases and, therefore, impact which functions may be compiled in the first compile stage.

In addition to the device machine code 344 and device virtual assembly 346, the device code repository also includes architecture information 348, which indicates which architectural features were assumed when device machine code 344 and device virtual assembly 346 where generated. Persons skilled in the art will recognize that the functions included within device machine code 344 and virtual assembly 346 reflect functions associated with the real architecture of PPU 202. The architecture information 348 provides compatibility information for device machine code 344 and compiler hints for a second stage compile operation, which may be performed by a device driver 103 at some time after the development of co-processor enabled application 134 has already been completed.

Inter-Procedural Memory Space Optimization

Figure 4:
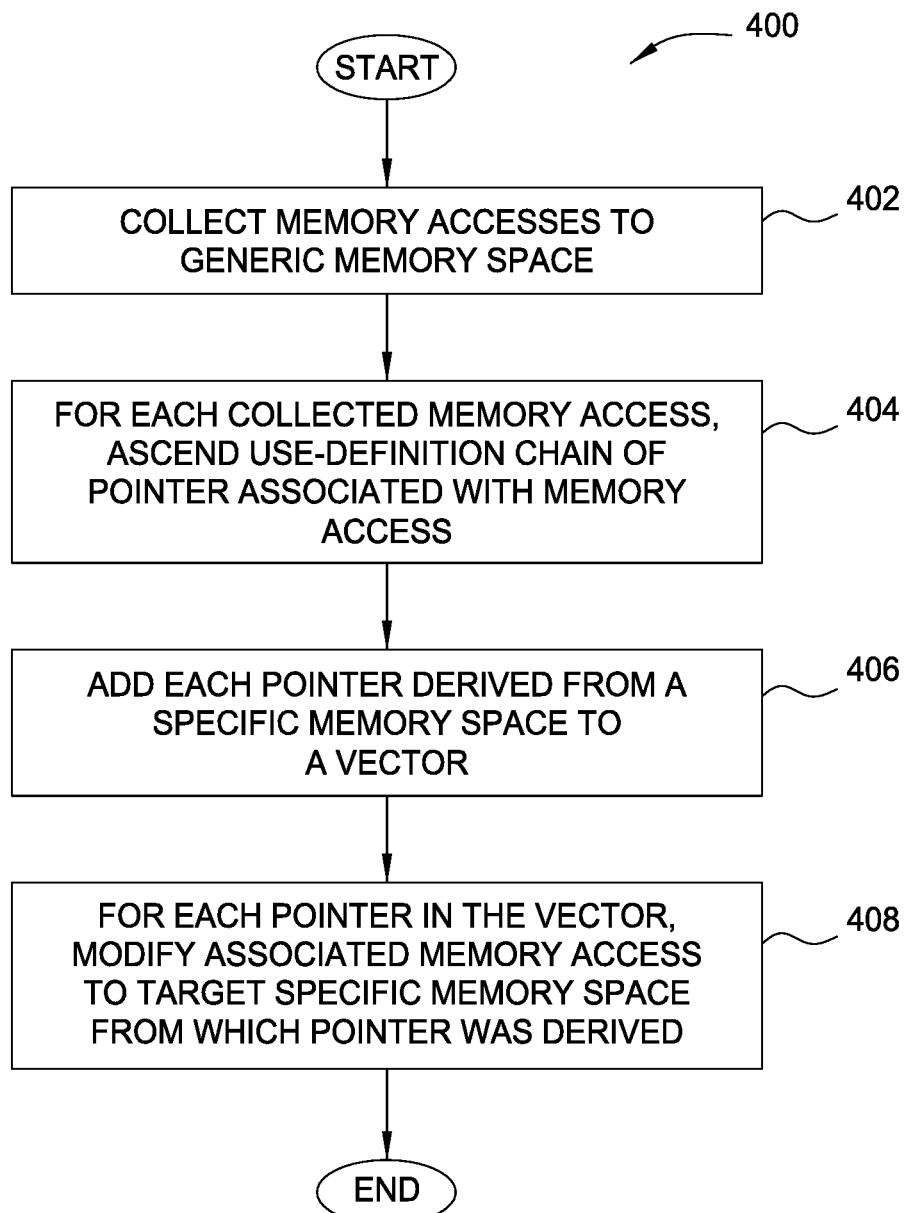
FIG. 4 is a flow diagram of method steps for optimizing memory access operations, according to one embodiment of the present invention.

Device compiler and linker 324 is also configured to perform various optimization routines with different procedures and/or functions within program code 310. As mentioned, program code 310 may initially include generic memory access operations that do not specify a particular memory space, and device compiler and linker 324 is configured to modify that program code to resolve the generic memory access operations into memory access operations that target a particular memory space. FIG. 4 describes an approach for optimizing memory access operations, FIG. 5 describes an approach to transferring constant variables to reside in a global memory space, and FIG. 6 outlines an exemplary scenario in which the approaches discussed in conjunction with FIGS. 4 and 5 may be beneficial.

FIG. 4 is a flow diagram of method steps for optimizing memory access operations, according to one embodiment of the present invention. Although the method steps are described in conjunction with the systems of FIGS. 1-2, persons skilled in the art will understand that any system configured to perform the method steps, in any order, is within the scope of the present invention. Device compiler and linker 324 shown in FIG. 3 is configured to implement the method steps.

As shown, a method 400 begins at step 402, where device compiler and linker 324 collects memory access operations within program code 310 that target a generic memory space. The memory access operations may be load/store operations or atomic operations such as, e.g., pointer de-referencing. At step 404, for each memory access operation collected at step 402, device compiler and linker 324 ascend a use-definition chain generated for the pointer associated with the memory access operation in order to determine the specific memory space from which the pointer is derived. Device compiler and linker 324 may generate the use-definition chain using conventional techniques, such as data flow analysis, in order to identify the use of the pointer and any previous definitions involving the pointer. In one embodiment, device compiler and linker 324 generates the use-definition chain using live analysis-based techniques.

At step 406, device compiler and linker 324 adds each pointer derived from a specific memory space (such as, e.g., global memory, local memory, shared memory, etc.) to a vector. At step 408, for each pointer in the vector generated at step 406, device compiler and linker 324 modifies the memory access operation associated with that pointer to target the specific memory space from which the pointer was derived. For example, a particular pointer p derived from global memory may be de-referenced during a load operation. By implementing the method 400, device compiler and linker 324 could replace the pointer de-reference with a load operation specifically targeting global memory.

In some situations, device compiler and linker 324 may not be able to implement the method 400 to modify a given memory access operation to target a specific memory space within program code 310. Such a situation may occur when program code 310 includes a branch instruction. Since the outcome of a branch instruction is unknown until run time, memory access operations that target different memory spaces depending on the outcome of the branch instruction may not be modifiable in the fashion described above. In some cases those memory access operations may be left untouched as generic memory access operations and resolved at run time.

However, memory access operations to a memory space reserved for constant variables may not be effectively resolved at run time. Since constant memory space typically resides within a read-only memory, memory access operations associated with constant memory are fundamentally different than other memory access operations, and, as such, may not be resolvable at run time. Accordingly, device compiler and linker 324 is configured to transfer certain constant variables and the associated memory access operations within program code 310 to reside in and target, respectively, a global memory space, as discussed in greater detail below in conjunction with FIG. 5.

Figure 5:
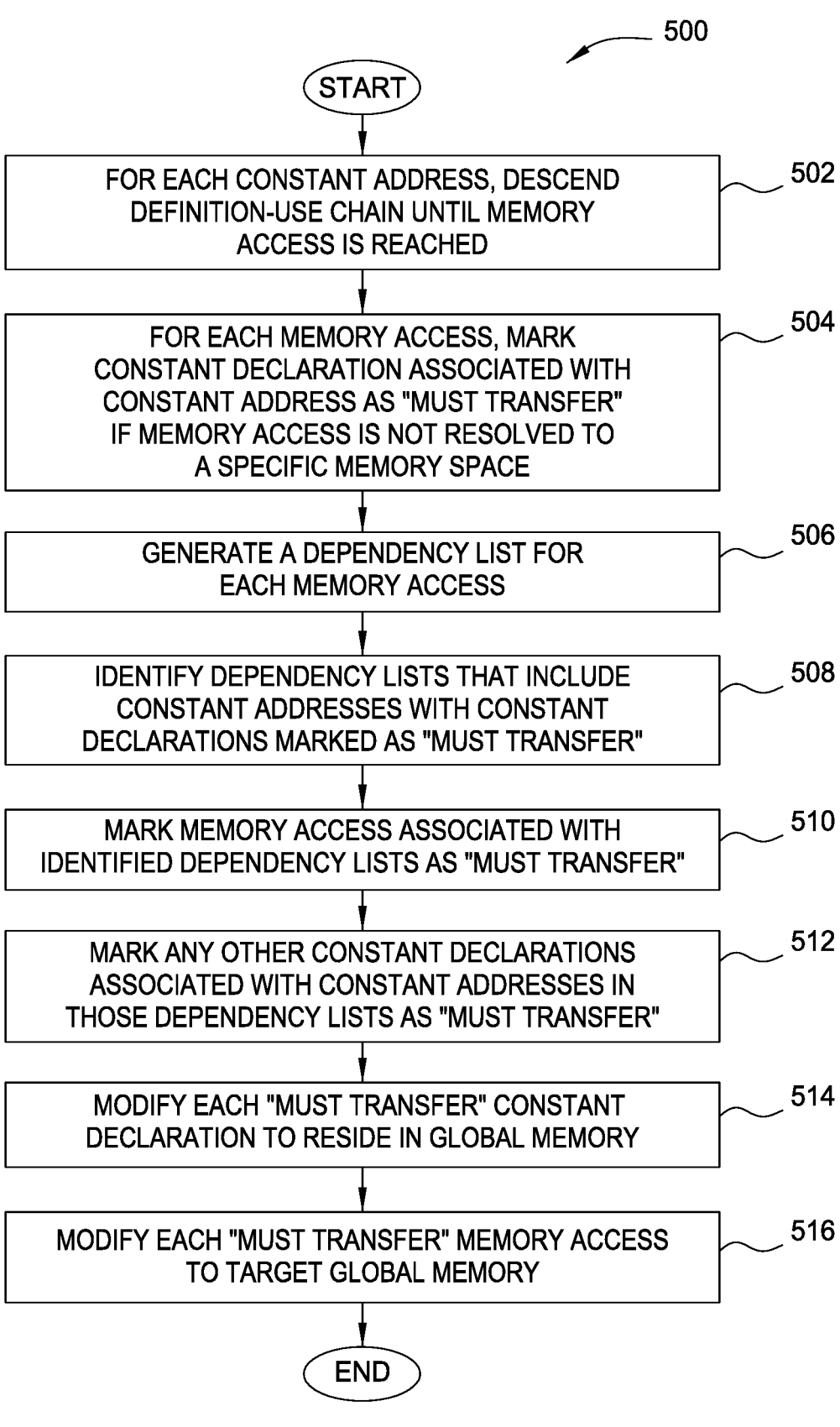
FIG. 5 is a flow diagram of method steps for transferring constant variables to a global memory space, according to one embodiment of the present invention.

FIG. 5 is a flow diagram of method steps for transferring constant variables to reside in global memory space, according to one embodiment of the present invention. Although the method steps are described in conjunction with the systems of FIGS. 1-2, persons skilled in the art will understand that any system configured to perform the method steps, in any order, is within the scope of the present invention. Device compiler and linker 324 shown in FIG. 3 is configured to implement the method steps.

As shown, a method 500 begins at step 502, where, for each constant address in program code 310, device compiler and linker 324 descends the definition-use chain for the constant address until a memory access operation is reached. Device compiler and linker 324 may generate the definition-use chain using conventional techniques, such as data flow analysis, in order to identify the declaration of the constant address and any subsequent uses. In one embodiment, device compiler and linker 324 generates the definition-use chain using live analysis-based techniques.

At step 504, for each memory access operation reached in step 502 and associated with a particular constant address, device compiler and linker 324 marks a constant declaration associated with the constant address as "must-transfer" if the memory access operation is not resolved to a specific memory space.

At step 506, device compiler and linker 324 generates a dependency list for each memory access operation. At step 508, device compiler and linker 324 identifies any dependency lists that include constant addresses with declarations marked as "must-transfer." At step 510, device compiler and linker 324 marks any memory access operations associated with the dependency lists identified in step 508 as "must-transfer." At step 512, device compiler and linker 324 marks any constant declarations associated with constant addresses within the identified dependency lists as "must-transfer." At step 514, device compiler and linker 324 modifies each transferable constant declaration to specify a location in global memory space. At step 516, device compiler and linker 324 modifies each transferable memory access operation to target global memory. The method 500 then ends.

By implementing the method 500, device compiler and linker 324 is capable of transferring constant variables to reside in a global memory space in situations where branch instructions would otherwise leave memory access operations involving those constant variables as generic memory access operations. Furthermore, device compiler and linker 324 is also configured to transfer any constant variables and associated memory access operations that depend on previously-transferred variables, thereby ensuring that all dependent constant variables are transferred together.

The methods 400 and 500 described above in conjunction with FIGS. 4 and 5, respectively, are described in greater detail below in conjunction with FIG. 6 by way of an example.

Figure 6:
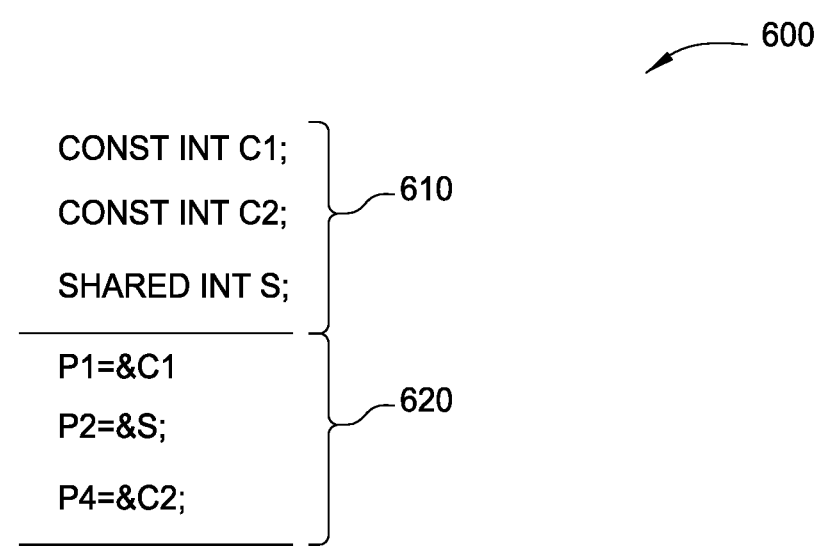
FIG. 6 sets forth a pseudocode example to illustrate the operation of a device compiler and linker, according to one embodiment of the present invention.
Figure 6:
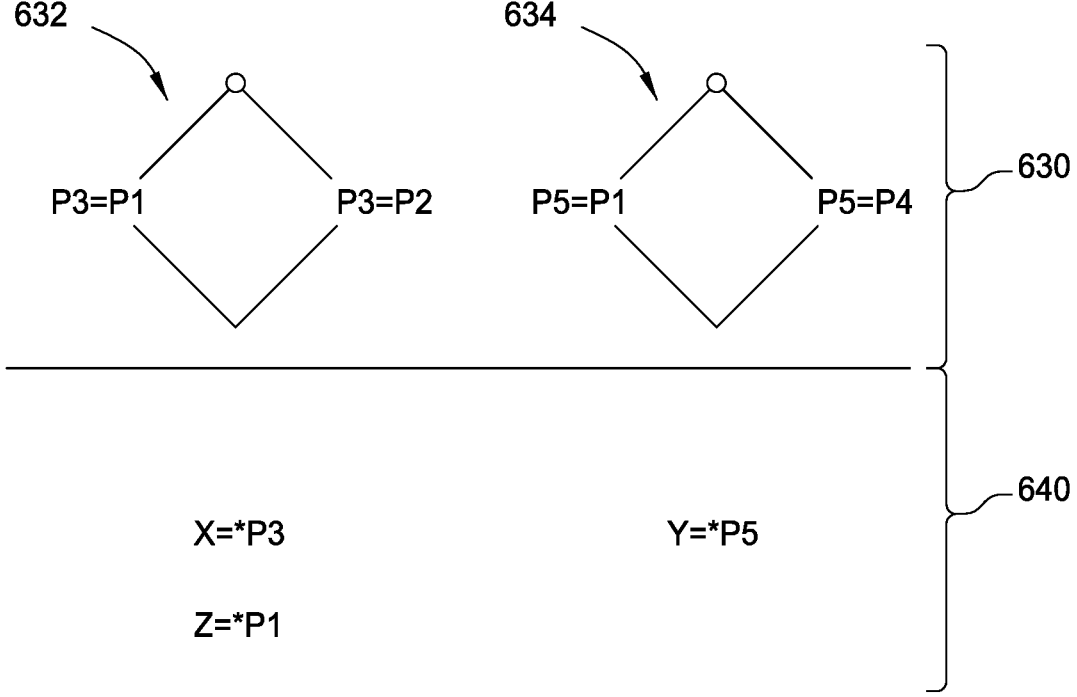

FIG. 6 sets forth a pseudocode example to illustrate the operation of a device compiler and linker, according to one embodiment of the present invention. As shown, pseudocode 600 includes pseudocode blocks 610, 620, 630, and 640. Pseudocode block 610 includes two constant int declarations for variables c1 and c2 and a shared int declaration for variable s. Pseudocode block 620 includes three pointer assignments p1, p2 and p4 to addresses of the variables c1, s, and c2. Pseudocode block 630 includes branch instructions 632 and 634 that assign pointers p3 and p5, respectively, differently depending on which branch is followed at run time. Pseudocode block 640 includes memory access operations that set the data stored at pointers p3, p5, and p1 to variables x, y, and z, respectively. Persons skilled in the art will understand that pseudocode 600 described above could be easily implemented in a variety of programming languages. In one embodiment, pseudocode 600 may be implemented in the CUDA™ programming language and may represent some or all of program code 310.

The following description represents just one example of device compiler and linker 324 performing the method 400 described above in conjunction with FIG. 4. In this example, device compiler and linker 324 first identifies the memory access operations within pseudocode block 640, similar to step 402 of the method 400. Those memory access operations are associated with pointers p1, p3, and p5, as is shown.

Device compiler and linker 324 then ascends the use-definition chain of each such memory access operation, similar to step 404 of the method 400. In pseudocode 600, device compiler and linker 324 ascends the use-definition chain of p3 by following each branch of branch instruction 632 up to the pointer assignments of p1 and p2 in pseudocode block 620, then tracing variables c1 and s back to the declaration of those variables within pseudocode block 610. Similarly, device compiler and linker 324 ascends the use-definition chain of p5 by following each branch of branch instruction 634 up to the pointer assignments of p1 and p4 in pseudocode block 620, then tracing variables c1 and c2 back to the declaration of those variables within pseudocode block 610. Device compiler and linker 324 ascends the use-definition chain of p1 by tracing that pointer back to the pointer assignment in pseudocode block 620, then tracing variable c1 back to the declaration of that variable within pseudocode block 610.

For each pointer associated with the memory access operations collected in step 404, device compiler and linker 324 adds the pointer to a vector if that pointer is derived from a specific memory space, similar to step 406 in the method 400. In pseudocode 600, pointer p1 is derived from constant variable c1, which resides in constant memory. Accordingly, device compiler and linker 324 adds p1 to the vector. Pointer p3 is derived from either p1 or p2, depending on branch instruction 632. Since p1 and p2 are derived from constant memory and shared memory, respectively, the memory access associated with p3 cannot be resolved to a specific memory space and pointer p3 is not added to the vector. Pointer p5 is derived from either of constant variables c1 and c2, and so regardless of which branch of branch instruction 634 is followed at run time, p5 will still be derived from constant memory. Accordingly, device compiler and linker 324 adds p5 to the vector.

Device compiler and linker 324 traverses the vector and, for each pointer in the vector, modifies the associated memory access operation to target the specific memory space from which the pointer was derived, similar to step 408 of the method 400. In doing so, device compiler and linker 324 modifies the memory access operations of p1 and p5 to specifically target constant memory. The memory access operation associated with p3 is left as a generic memory access operation.

Once the method 400 of FIG. 4 has been performed on the pseudocode 600, the device compiler and linker 324 may then re-process pseudocode 600 by performing the method 500 of FIG. 5 on the pseudocode 600, as discussed by way of example below.

The following description represents just one example of device compiler and linker 324 performing the method 500 described above in conjunction with FIG. 5. In this example, device compiler and linker 324 first descends the definition-use chain of each constant address until a memory access is reached, similar to step 502 of the method 500. Device compiler and linker 324 descends the definition-use chain of constant variables c1 and c2 declared in pseudocode block 610, until reaching the memory access operations associated with those constant variables. As shown, c1 can be traced down to memory access operations involving pointers p1, p3, and p5, while c2 can be traced down to memory access operations involving just pointer p5.

For each of those memory access operations derived from a particular constant declaration, device compiler and linker 324 marks that constant declaration as "must-transfer" if the memory access is not resolved to a specific memory space, similar to step 504 of the method 500. As discussed above in the previous example, the memory access operation associated with pointer p3 was left as a generic memory access operation, and so device compiler and linker 324 marks the constant declaration associated with that memory access operation (the declaration for c1) as "must-transfer."

Device compiler and linker 324 then generates a dependency list for each memory access, similar to step 506 of the method 500. Device compiler and linker 324 is configured to identify any dependency lists that include constant addresses with constant declarations marked as "must-transfer," similar to step 508 of the method 500. In pseudocode 600, the memory access operation associated with pointer p1 depends on c1, which was marked as "must-transfer." Likewise, the memory access operation associated with pointer p3 depends on c1 and the memory access operation associated with pointer p5 also depends on c1. Accordingly, device compiler and linker 324 would identify the dependency lists associated with those memory access operations.

Device compiler and linker 324 would then mark the memory access operations associated with the identified dependency lists as "must-transfer," similar to step 510 of the method 500. In the example described herein, device compiler and linker 324 would mark all of the memory access operations shown in pseudocode block 640 as "must-transfer."

Device compiler and linker 324 would then mark any other constant declarations associated with constant addresses in the identified dependency lists as "must-transfer," similar to step 512 of the method 500. In pseudocode 600, device compiler and linker 324 would determine that the memory access operation for p5 depends on constant variable c2, and since the dependency list for that memory access operation was identified previously, then the constant variable declaration for c2 would also be marked as "must-transfer."

Device compiler and linker 324 would then modify each "must-transfer" constant variable declaration to reside in global memory, similar to step 514 of the method 500, and then modify each "must-transfer" memory access operation to target global memory, similar to step 516 of the method 500. In doing so, device compiler and linker 324 may also promote data from the constant memory space to the global memory space, as needed. By performing the technique described in this example, device compiler and linker 324 transfers all constant memory variables and memory access operations to reside in and target, respectively, global memory, thus avoiding situations where a generic memory access operation may or may not target constant memory depending on the outcome of a branch instruction.

In sum, a device compiler and linker is configured to optimize program code of a co-processor enabled application by resolving generic memory access operations within that program code to target specific memory spaces. In situations where a generic memory access operation cannot be resolved and may target constant memory, constant variables associated with those generic memory access operations are transferred to reside in global memory.

Advantageously, a graphics processing unit (GPU) is not required to resolve all generic memory access operations at run time, thereby conserving resources and accelerating the execution of the application. Further, the GPU is enabled to perform additional program code optimizations with the application program code, including memory access re-ordering and alias analysis, further accelerating program code execution.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. One or more processors, comprising:
one or more circuits to cause a compiler to:
identify, from source code, a memory access operation to access a first type of memory;
generate an indicator for the memory access operation representing the first type of memory;
generate a dependency list related to the indicator included in the memory access operation, the dependency list to include one or more constant addresses and one or more declarations in the source code that reference the indicator;
modify the memory access operation to access a second type of memory based, at least in part, on the indicator representing a second type of memory different from the first type of memory and the dependency list; and
compile source code with the modified access operation, wherein the compiled code is to indicate the second type of memory into which information is to be stored.

2. The one or more processors of claim 1, wherein the second type of memory comprises a local memory space, a shared memory space, or a constant memory space.

3. The one or more processors of claim 1, wherein the one or more circuits are further to analyze a use-definition chain related to a first pointer included in the first memory access operation to determine that the first pointer is derived from one of the second type of memory.

4. The one or more processors of claim 3, wherein the one or more circuits are further to generate the use-definition chain related to the first pointer by performing a data flow analysis on the source code in order to identify each definition and each use of the first pointer.

5. The one or more processors of claim 1, wherein the one or more circuits are further to replace the memory access operation in the source code with a second memory access operation that targets a different memory space.

6. The one or more processors of claim 1, wherein the compiler is to compile source code to machine code.

7. The one or more processors of claim 1, wherein the one or more circuits are further to store the information to the second type of memory during execution of a compiled version of the source code.

8. The one or more processors of claim 1, wherein each of the one or more second types of memory is accessible by each processing core of a set of processing cores within a parallel processing unit.

9. The one or more processors of claim 8, wherein a local memory space of the second type of memory is accessible by only one processing core included in the set of processing cores, a shared memory space of the second type of memory and a constant memory space of the second type of memory are accessible by two or more of the processing cores included in the set of processing cores, and the constant memory space resides in read-only memory.

10. The one or more processors of claim 1, wherein the one or more first types of memory indicated by the source code comprise a generic memory space.

11. The one or more processors of claim 1, wherein the one or more circuits are to cause the compiler to indicate the second type of memory based, at least in part, on a pointer.

12. The one or more processors of claim 1, wherein the one or more circuits are to cause the compiler to indicate the second type of memory based, at least in part, on a specific memory space from which a pointer is derived.

13. The one or more processors of claim 1, wherein the one or more circuits are to cause the compiler to indicate the second type of memory by causing the compiler to dereference a pointer to determine a specific memory space.

14. One or more processors, comprising:
one or more circuits to perform one or more executable programs having source code that indicates a first type of memory into which information is to be stored, wherein the one or more executable programs are to:
identify, from the source code, a memory access operation to access the first type of memory;
generate an indicator for the memory access operation representing the first type of memory;
generate a dependency list related to the indicator included in the memory access operation, the dependency list to include one or more constant addresses and one or more declarations in the source code that reference the indicator;
modify the memory access operation to access a second type of memory based, at least in part, on the indicator representing a second type of memory different from the first type of memory and the dependency list; and
indicate the second type of memory into which information is to be stored.

15. The one or more processors of claim 14, wherein the second type of memory indicated by the one or more executable programs comprises a local memory space, a shared memory space, or a constant memory space, wherein the local memory space is accessible by only one processing core included in a plurality of processing cores.

16. The one or more processors of claim 15, wherein the shared memory space and the constant memory space are accessible by two or more processing cores included in the plurality of processing cores.

17. The one or more processors of claim 15, wherein the one or more circuits are further to analyze a use-definition chain related to a first pointer that accesses the information and is included in the source code to determine that the first pointer is derived from one of the local memory space, the shared memory space, or the constant memory space.

18. A system, comprising one or more computers having one or more processors to cause a compiler to:
   identify, from source code, a memory access operation to access a first type of memory;
   generate an indicator for the memory access operation representing the first type of memory;
   generate a dependency list related to the indicator included in the memory access operation, the dependency list to include one or more constant addresses and one or more declarations in the source code that reference the indicator;
   modify the memory access operation to access a second type of memory based, at least in part, on the indicator representing a second type of memory different from the first type of memory and the dependency list; and
   compile source code with the modified access operation, wherein the compiled code is to indicate the second type of memory into which information is to be stored.

19. The system of claim 18, wherein the second type of memory comprise a local memory space, a shared memory space, or a constant memory space.

20. The system of claim 19, wherein the one or more processors are further to analyze a use-definition chain related to a first pointer included in a first access memory operation associated with the source code to determine that the first pointer is derived from one of the local memory space, the shared memory space, or the constant memory space.

21. The system of claim 20, wherein the one or more processors are further to generate the use-definition chain related to the first pointer by performing a data flow analysis on the source code in order to identify each definition and each use of the first pointer.

22. The system of claim 19, wherein the local memory space is accessible by only one processing core included in a set of processing cores, the shared memory space and the constant memory space are accessible by two or more processing cores included in the set of processing cores, and the constant memory space resides in read-only memory.

23. The system of claim 18, wherein the one or more processors are further to compile the source code to machine code.

24. A method, comprising:
   identifying, from source code, a memory access operation to access a first type of memory;
   generating an indicator for the memory access operation representing the first type of memory;
   generating a dependency list related to the indicator included in the memory access operation, the dependency list to include one or more constant addresses and one or more declarations in the source code that reference the indicator;
   modifying the memory access operation to access a second type of memory based, at least in part, on the indicator representing a second type of memory different from the first type of memory and the dependency list; and
   causing a compiler to compile source code with the modified access operation, wherein the compiled code is to indicate the second type of memory into which information is to be stored.

* * * * *